United States Patent
Köstli et al.

(10) Patent No.: US 10,766,611 B2
(45) Date of Patent: Sep. 8, 2020

(54) HELICOPTER ROTOR TRANSMISSION

(71) Applicant: KOPTER GROUP AG, Mollis (CH)

(72) Inventors: Roman Köstli, Hittnau (CH); Martin Stucki, Pfäffikon (CH)

(73) Assignee: KOPTER GROUP AG, Mollis (CH)

( * ) Notice: Subject to any disclaimer, the term of this patent is extended or adjusted under 35 U.S.C. 154(b) by 378 days.

(21) Appl. No.: 15/815,988

(22) Filed: Nov. 17, 2017

(65) Prior Publication Data

US 2018/0141649 A1 May 24, 2018

(30) Foreign Application Priority Data

Nov. 21, 2016 (CH) .................................... 1536/16

(51) Int. Cl.
*B64C 27/12* (2006.01)
*B64C 27/02* (2006.01)
*F16H 1/28* (2006.01)

(52) U.S. Cl.
CPC ............ *B64C 27/12* (2013.01); *B64C 27/025* (2013.01); *F16H 1/28* (2013.01); *F16H 1/2836* (2013.01)

(58) Field of Classification Search
CPC ......... B64C 27/12; B64C 27/025; F16H 1/28; F16H 1/2836
See application file for complete search history.

(56) References Cited

U.S. PATENT DOCUMENTS

| 4,251,987 A | 2/1981 | Adamson | |
| 9,260,186 B1 * | 2/2016 | van der Westhuizen | ................... B64C 27/605 |
| 2013/0005528 A1 * | 1/2013 | Ai | .............. F16H 1/28 475/348 |
| 2015/0354672 A1 * | 12/2015 | Bouwer | .................. F16H 3/663 244/62 |

FOREIGN PATENT DOCUMENTS

| CH | 256401 A2 | 8/1948 |
| WO | 98/16762 A1 | 4/1998 |

OTHER PUBLICATIONS

Search Report dated Mar. 15, 2017 for CH15362016 filed Nov. 21, 2016.

* cited by examiner

*Primary Examiner* — Rodney A Bonnette
(74) *Attorney, Agent, or Firm* — Paul D. Bianco; Gary S. Winer; Fleit Intellectual Property Law

(57) ABSTRACT

A helicopter rotor transmission in which the average lubricant monitoring and replenishment intervals are to be significantly increased. The helicopter rotor transmission has a central cavity, in which runs a bearing mast that is fixed in a locationally and rotationally manner, which is held passing through the gear housing at least partially in the direction of the central axis. An internally toothed gear ring of a rotatable rotor mast can be rotated about the central axis, with fixed rotation of the planetary gears about their planetary gear axes, such that the rotor mast can be set in rotation by means of a gear ring driver attached to the gear ring.

14 Claims, 5 Drawing Sheets

HELICOPTER ROTOR TRANSMISSION

TECHNICAL FIELD

The present invention describes a helicopter rotor transmission with a transmission housing, in which at least one central drive gear is rotatably supported by at least one drive train, wherein by means of the drive gear a plurality of planetary gear carriers defining planetary gears on associated planetary gear axes, are arranged such that they are rotatably mounted, whereby a rotatable rotor mast can be rotatably driven about a central axis or rotor mast axis by means of the helicopter transmission.

BACKGROUND

In the field of helicopter construction, the main rotor and tail rotor are usually driven by means of a helicopter rotor transmission, usually in the form of a planetary transmission. Such a helicopter transmission is housed in a transmission housing. The transmission housing is attached to the load-bearing structure of the helicopter at a plurality of points and is coupled to a rotor. This type of helicopter rotor transmission has prevailed, since a compact, extremely reliable and weight-saving design is possible.

Planetary transmissions are of known art, and when used as helicopter rotor transmissions these planetary transmissions have a plurality of externally toothed planetary gears, which are mounted on associated planetary carriers. As dictated by the design the planetary gears are mounted in a locationally fixed gear ring, in the form of an internally toothed ring gear, such that they can rotate about themselves and within the ring gear. In this case, the planetary gears respectively rotate about their planetary axes and rotate within the gear ring about a central rotor axis. The rotation of the planetary gears is effected by a rotational drive of a central sun wheel, which is also locationally fixed, but is mounted such that it can rotate about the central rotor axis. A drive rotates the central sun wheel so that the rotational movement is transferred via the sun wheel and the planetary gears onto the rotor mast, wherein the rotor mast protrudes from the side of the transmission housing remote from the drive side. With this arrangement of known art, compact, light, sufficiently powerful and robust helicopter rotor transmissions can be achieved so as to drive various rotor masts.

In practice, however, it has been shown that this type of helicopter rotor transmission requires increased maintenance costs. In particular, the lubrication system must be checked and readjusted sufficiently frequently. Since as much weight as possible must be saved in helicopter construction, additional devices for an automatic lubrication system, for the control of an automatic lubrication system, or for the complex return and reuse of lubricant are omitted as far as possible. Accordingly, the moving components must be checked for sufficient lubrication at regular intervals and manually readjusted. Up to the present time the helicopter rotor transmissions of known art must be serviced and/or repaired once more after just a few flying hours, as dictated by circumstances and costs.

The lubrication systems of helicopter rotor transmissions of known art have already been optimised by the use of different lubricants, wherein semi-automatic single lubrication procedures have also been investigated. An attempt has also been made to reduce maintenance costs by means of a central lubrication system. However, none of these efforts have as yet led to the desired significant reduction in maintenance costs for such helicopter rotor transmissions.

There is a desire to simplify the lubrication system of the helicopter rotor transmission, which is not easy because of the poor access to the helicopter rotor transmission.

SUMMARY OF THE INVENTION

The disclosure relates to a compact, lightweight helicopter rotor transmission comprising few components, the maintenance costs of which are reduced by achieving lubrication that is maintained for a longer period of time. The disclosure also relates to a helicopter rotor transmission with significantly extended maintenance intervals, i.e. lubricant monitoring and replenishment intervals, compared with the prior art.

In an embodiment, the operational reliability of the helicopter rotor transmission is additionally increased and ultimately the service life of the helicopter rotor transmission is further extended. As a result of the particular configuration of the helicopter rotor transmission lubrication becomes easier and the maintenance intervals are extended.

In addition, it was possible to achieve an extremely compact helicopter transmission, which permits cabling, control rods and other components to pass through from the drive train side to the rotor side, as explained in what follows.

BRIEF DESCRIPTION OF THE DRAWINGS

A preferred example of embodiment of the subject matter of the invention is described below in conjunction with the accompanying drawings.

FIG. 5a shows a perspective view of the gear driver with cross-toothing, while

DESCRIPTION

Figure 1:
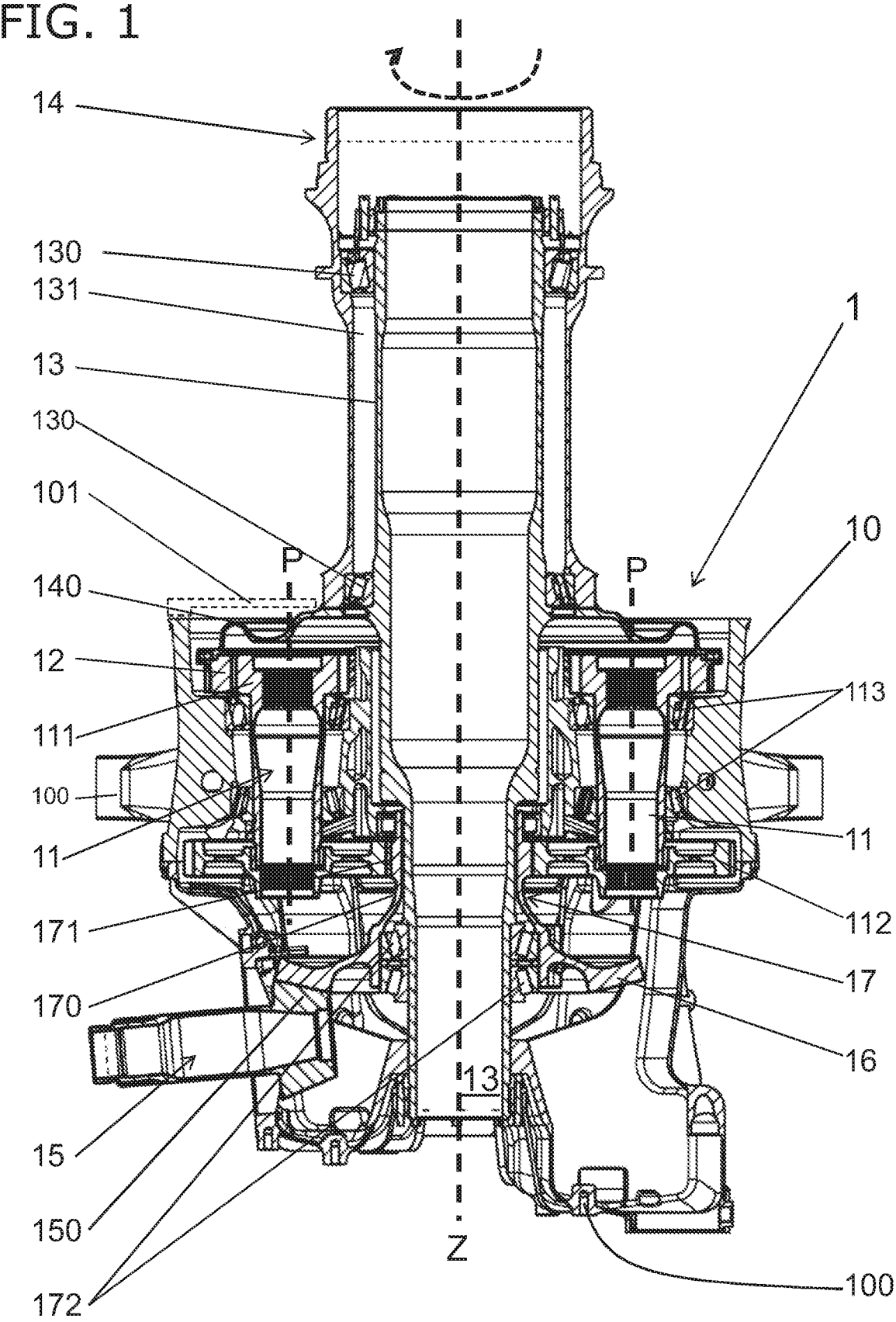
FIG. 1 shows a longitudinal section through a helicopter rotor transmission in the installed state.

In the following, a helicopter rotor transmission 1 is described, which is designed in the form of a planetary transmission and can be used for driving a main rotor or a tail rotor. Thus, the helicopter rotor transmission 1 shown here can be used as a main transmission, in the specialist terminology called the "main gear box" in helicopter construction.

The helicopter rotor transmission 1 is surrounded by a transmission housing 10, whereby the various components are held, protected against external influences. By means of at least one transmission housing mounting 100, the transmission housing 10 can be attached to a helicopter support structure (not shown). The transmission housing 10 is closed with a housing cover 101, which here is schematically indicated by dashed lines.

The helicopter rotor transmission 1 has a central cavity. In this central cavity, the bearing mast 13 is mounted in a locationally and rotationally fixed manner; here it is configured as a hollow body surrounding a central axis Z. At the same time the central axis Z forms the longitudinal direction of the bearing mast 13 and an axis of rotation of a rotor mast 14, which is also referred to as the rotor mast axis. The bearing mast 13 can be configured in different lengths in the longitudinal direction along the central axis Z, wherein it extends at least partially through the centre of the transmission housing 10. Here the bearing mast 13 is configured so as to extend completely across the transmission housing 10, wherein control rods (not shown) or electrical lines such as cables or the like can be routed through the central cavity in the bearing mast 13, essentially along the rotor mast axis. As a result of such a placement in the bearing mast, the control rods or cables cannot be damaged by external influences such as bird strike, etc., in contrast to an arrangement outside the rotor mast. A deflection device for deflecting and aligning the control rods is preferably arranged on the drive train side of the transmission housing.

As can also be seen in FIG. 1, the bearing mast 13 is here configured so as to taper from the rotor side in the direction of the drive train side, whereby the bearing mast can be inserted from the rotor side into the central cavity of the transmission housing 10, and can be attached in the transmission housing 10.

In accordance with FIG. 1 a drive gear 16 is mounted on the bearing mast 13 such that it can rotate, wherein the drive gear 16 here has helical bevel gear toothing, which can interact with at least one drive train gear 150 of at least one drive train 15. As an alternative to helical toothing, the drive gear can have spiral toothing. A sun wheel 17, which is designed as a hollow shaft, is connected to the drive gear 16; the sun wheel 17 has a tubular section 170 with, for example, straight-toothed external toothing 171. By means of the sun wheel 17, the drive gear 16 is attached to the locationally and rotationally fixed bearing mast 13, and is mounted such that it can rotate about the central axis Z. As shown here in FIG. 1, the sun wheel 17 is mounted on two sun wheel bearings 172 such that it can rotate on, i.e. around, the bearing mast 13. The sun wheel 17 can be driven by the drive train 15, whereby the sun wheel 17 represents a hollow driving shaft. Alternatively or additionally to such sun wheel bearings 172 arranged between the bearing mast 13 and the sun wheel 17, the sun wheel 17 can be mounted such that it can rotate about the bearing mast 13 by means of further sun wheel bearings 172, which are suitably placed between the transmission housing 10 and the sun wheel 17 such that they can rotate about the bearing mast 13 (see FIG. 6).

At the height of the external toothing 171 of the sun wheel 17, a plurality of planetary drive gears 112 are arranged on associated planetary gear carriers 11, for example by means of splines, wherein the planetary gear carriers 11 can be regarded as planetary shafts. The planetary drive gears 112 in each case have external toothing and are in engagement with the external toothing 171 of the sun wheel 17.

The planetary gear carriers 11 are configured so as to be fixed in location and are spaced apart from the transmission housing 10, i.e. from the central axis Z, i.e. from the rotatable sun wheel 17, such that the planetary drive gears 112 and their planetary gear carriers 11 can be set into rotation about fixed axes within the transmission housing 10. In order to achieve rotation of the planetary gear carriers 11 that is as free of friction as possible, at least two planetary gear carrier bearings 113 are arranged spaced apart in the direction of a planetary gear axis P between the walls of the transmission housing 10 and the planetary gear carriers 11.

The planetary gear carriers 11 are configured as double planetary gear carriers, since one planetary gear 111 is arranged on each planetary gear carrier 11, spaced apart in the direction of the planetary gear axis P, for each planetary drive gear 112. The planetary drive gears 112 are in each case arranged parallel to the associated planetary gears 111. The plurality of planetary gear carriers 11 are distributed about the central axis Z, distributed around the outer circumference of the bearing mast 13 and arranged at fixed locations in the transmission housing 10. The planetary gears 111 and the planetary drive gears 112 of all planetary gear carriers 11 here have sufficient clearance from the walls of the transmission housing 10 and from the bearing mast 13, which is locationally and rotationally fixed. In this manner an undisturbed rotation of the planetary gear carriers 11 and thus the planetary gears 111 is possible, in each case about their planetary gear axes P.

The helicopter rotor transmission 1 shown here can be regarded as a two-stage planetary transmission, which is why, in accordance with the inventive helicopter rotor transmission 1, a hollow shaft rotatably mounted around the locationally and rotationally fixed bearing mast 13 functions as the sun wheel 17. Here the bearing mast 13 crosses the transmission housing 10 completely, and protrudes from the transmission housing 10 on the side remote from the drive train 15.

At the height of the planetary gears 111 in the direction of the central axis Z, a gear ring 12 is arranged such that it can rotate about the central axis Z. The gear ring 12 surrounds all the planetary gears 111, can be driven by the rotation of the planetary gears 111, and can thus rotate about the planetary gears 111, the central axis Z, and in accordance with the embodiment shown, surrounding the outer circumference of the bearing mast 13.

A gear ring driver 140 is arranged on the gear ring 12, by means of which the rotation of the gear ring 12 can be transferred onto the rotatable rotor mast 14. The housing cover 101 closes the gear housing 10 so as to surround the gear ring driver 140. For this purpose, the housing cover 101 is attached to the transmission housing 10 and protrudes until just before the rotatable rotor mast 14. The housing cover 101 is thus not attached on the rotor mast side, so that the rotor mast 14 can rotate without any problems.

The rotor mast 14 is of tubular design and is here rotatably mounted concentrically aligned about the part of the bearing mast 13 protruding from the transmission housing 10. The longitudinal axes of the two masts 13, 14 are thus aligned, wherein only the rotor mast rotates about the axis Z.

The rotor mast 14 is designed as a hollow shaft and forms a drive shaft, which can be indirectly driven by means of the helicopter rotor transmission 1 through the drive train 15. A rotor head, comprising a plurality of rotor blades, is attached to the side of the rotor mast 14 that is opposite the helicopter transmission 1. For purposes of mounting the rotor mast 14, further bearings 130 are provided between the bearing mast 13 and the rotor mast 14; here two bearings 130 are spaced apart from one another along the central axis Z. A cavity 131 is formed between the bearing mast 13 and the rotor mast 14, in which, for example, a tube feeding lubricating oil to the bearings 130 in the direction of the rotor side can be arranged.

Figure 2:
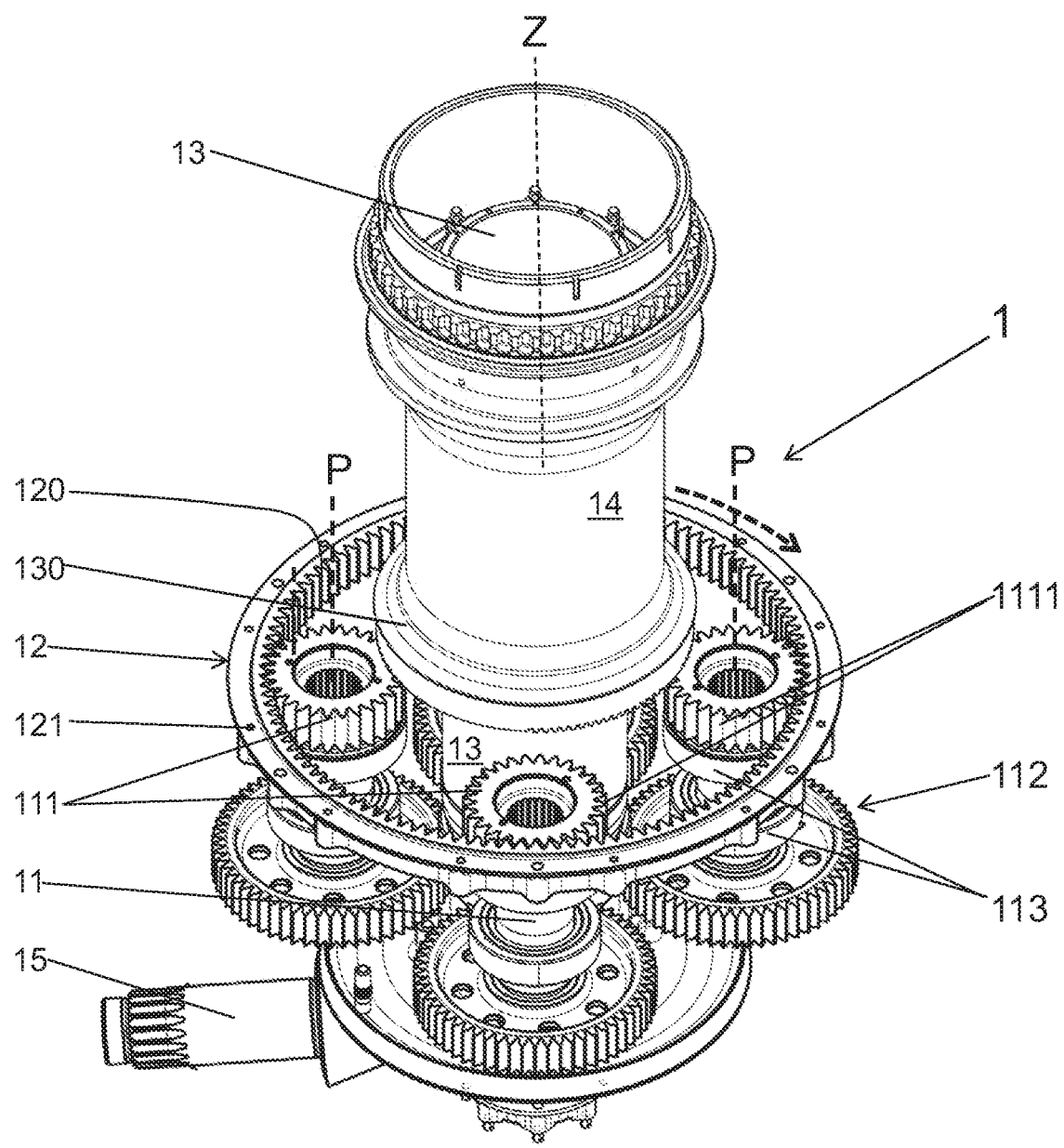
FIG. 2 shows a schematic view of the helicopter transmission, with the transmission housing removed, after it has been installed on the bearing mast, and before the installation of a gear ring driver.

In FIG. 2, the rotation of the gear ring 12 around the outer contours of the planetary gears 111 is indicated by the arrow at the top of the figure. While the planetary gears 111 and the planetary gear carriers 11 rotate about fixed axes, the gear ring 12 runs around the central axis Z. Internal toothing 120 is arranged on the gear ring 12, which engages with external toothing 1111 on all the planetary gears 111. In this embodiment it is the gear ring that rotates, so that the planetary gears 111 are mounted on fixed axes. The gear driver 140 can be attached to the rotating gear ring 12 by means of attachment 121, for example through-holes, or threaded holes and appropriate screws. Here the means of attachment 121 are arranged distributed along the circumference on a surface directed towards the central axis Z, spaced apart from the bearing mast 13. A bearing 130 between the bearing mast 13 and the rotor mast 14 (not shown) is represented surrounding the fixed bearing mast 13.

Figure 3:
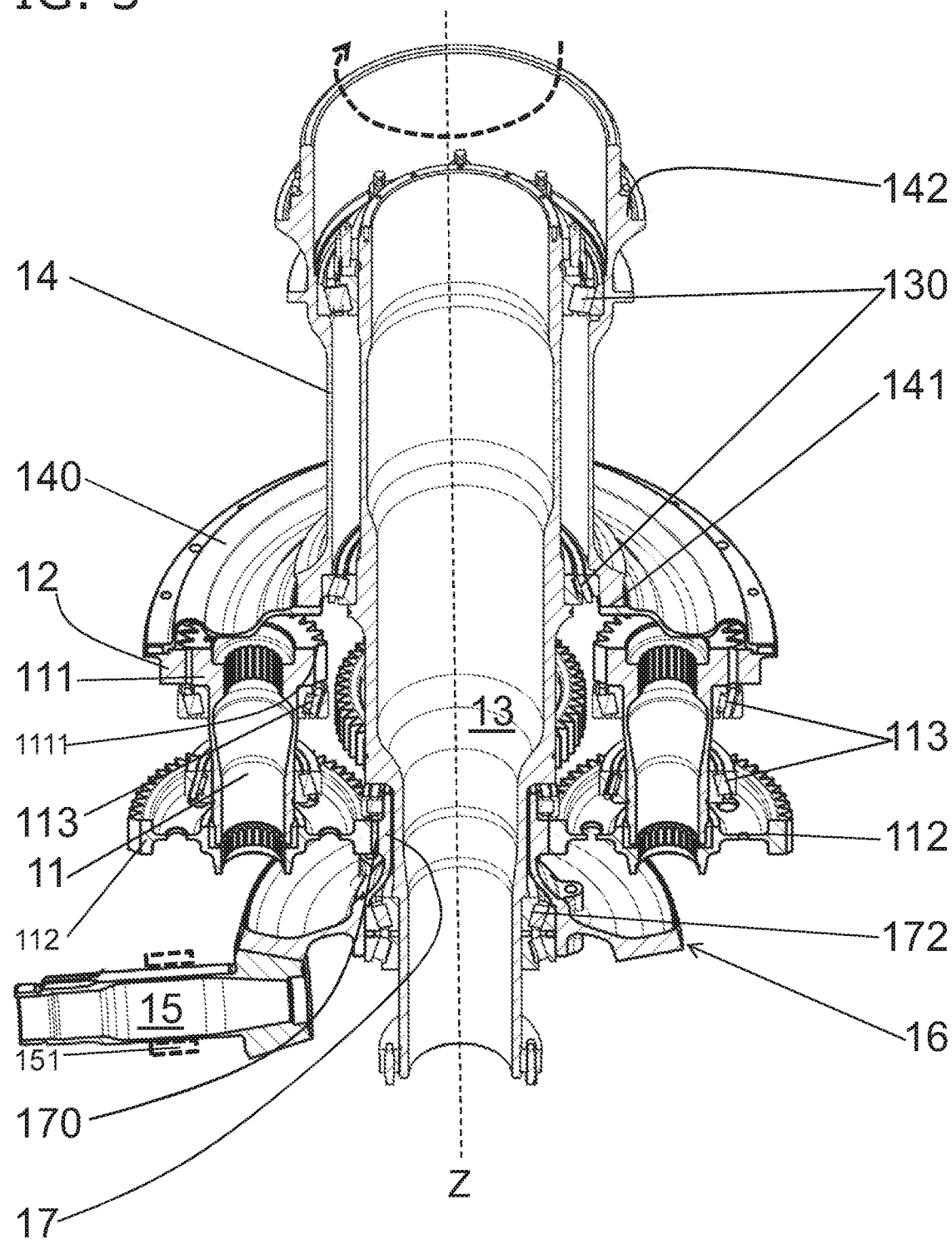
FIG. 3 shows a longitudinal section through the helicopter rotor transmission, wherein the transmission housing and the housing cover have been omitted on the rotor mast side.

The longitudinal section through the helicopter transmission 1, together with the bearing mast 13 and the rotor mast 14, as in FIG. 3, allows an insight when the housing cover 101 is removed into the configuration of the gear ring driver 140 and the connection to the rotor mast 14. The gear ring driver 140 is designed in the form of a hood, which prevents any contact between the gear ring driver 140 and the planetary gears 111. The gear ring driver 140 is connected on one side to the gear ring 12, and on the side facing the central axis Z to the rotor mast 14. The configuration of the gear ring driver 140 should be as light as possible, but sufficiently robust; accordingly, an annular, hood-like or hood-shaped component made of steel, titanium, or the like with a wall thickness of preferably 2 to 12 mm, and more preferably 3 to 8 mm, with these properties here forms the gear ring driver 140.

Figure 6:
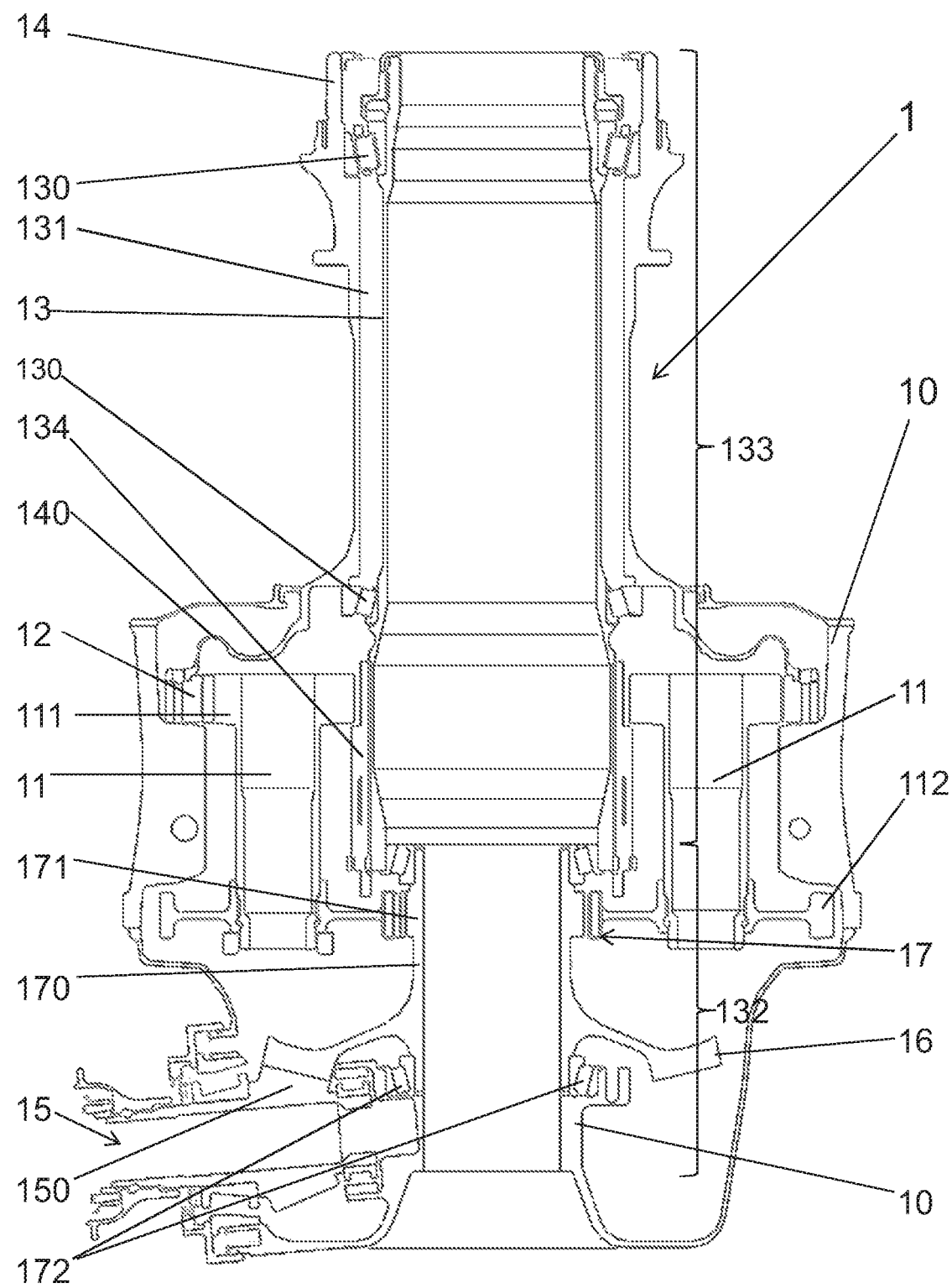
FIG. 6 shows a longitudinal section through another preferred embodiment of a helicopter transmission in the installed state.

Alternatively, the rotor mast 14 and the gear ring driver 140 can be manufactured as a single integral component, (see FIG. 6).

The drive gear 16 is rotated by the drive train 15, which is mounted by means of drive train bearings 151. By virtue of the resulting rotation of the sun gear 17 connected to the drive gear 17 and its associated external toothing 171, the rotation is transmitted to the planetary drive gears 112 and thus the planetary gears 111, wherein this can be regarded as a first stage of the present two-stage planetary transmission. In a second stage, the planet gears 111 transfer the forces to the internal toothing 120 of the gear ring 12 and the resulting rotation of the gear ring 12 about the central axis Z is transmitted by means of gear ring drivers 140 to the rotor mast 14, which protrudes out of the transmission housing 10. The torque from the gear ring 12 is thus transferred to the rotor mast 14 by means of gear ring drivers 140.

Figure 4:
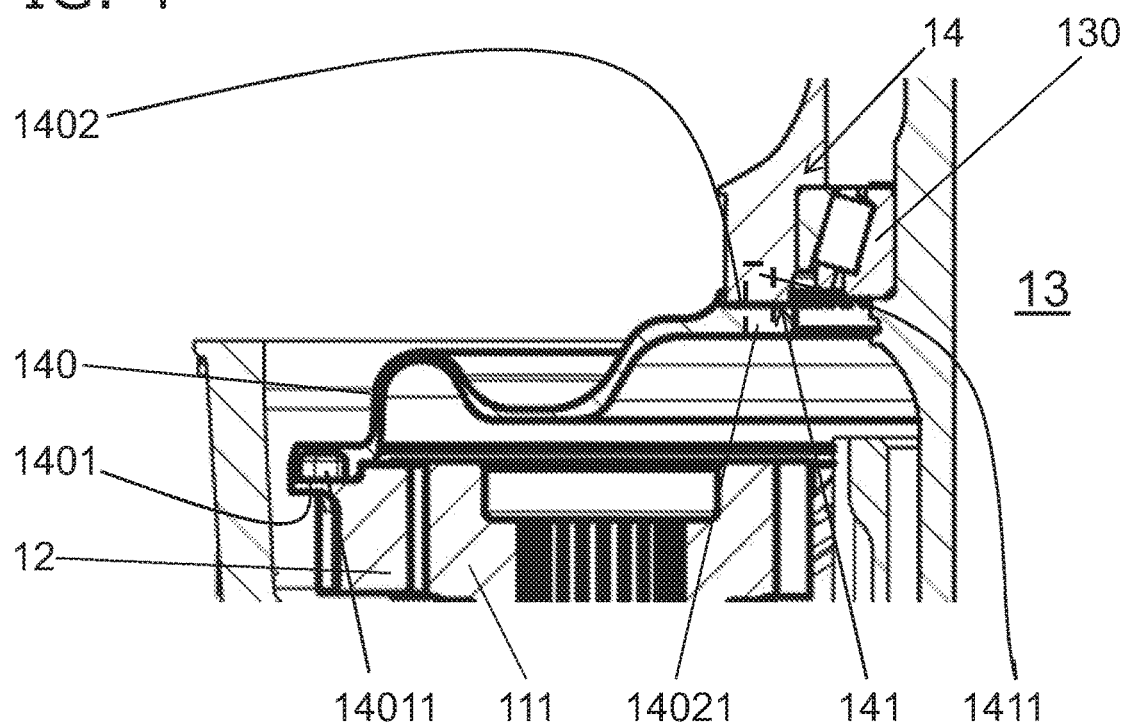
FIG. 4 shows a sectional view through the rotor mast side part of the helicopter transmission, with a detailed view of the gear driver and the attachment to the rotor mast.
Figure 5B:
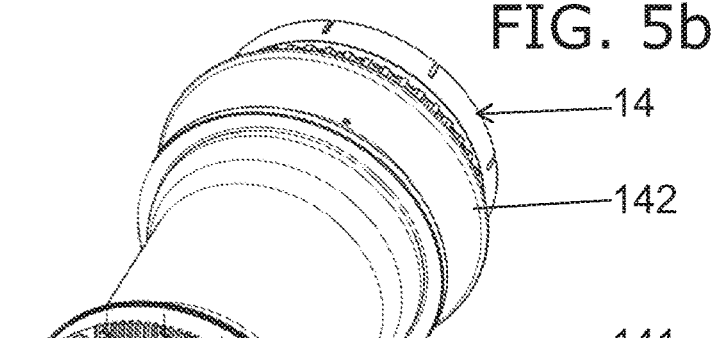
FIG. 5b shows a perspective view of the rotor mast/gear ring flange with cross-toothing.
Figure 5A:
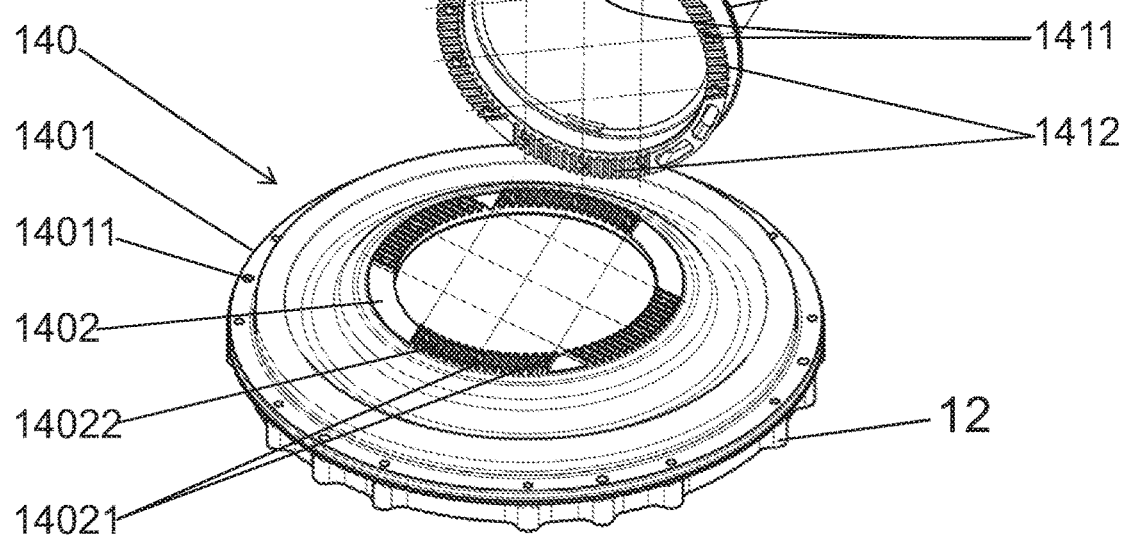

The rotor mast 14 has a rotor mast/gear ring flange 141 and a rotor coupling flange 142. FIG. 4 shows in detail the attachment of the gear ring driver 140 to the gear ring 12 and the rotor mast 14. A plurality of through-holes 14011 are formed in the outer flange 1401 of the gear ring driver 140 as shown in FIG. 5a, wherein the gear ring driver 140 with the outer flange 1401 can be attached to corresponding means of attachment (see FIG. 2) of the gear ring 12 by means of appropriate screws passing through the through-holes 14011, such that it can be mounted so as to rotate with the latter. Alternatively or additionally to such a screwed connection between the outer flange 1401 and the gear ring 12, the surfaces of the gear ring 12 and of the outer flange 1401 of the gear ring driver 140 that are to be brought into contact with one another can be provided with additional corresponding toothing or cross-toothing.

On the side remote from the outer flange 1401, an inner flange 1402 is formed on the gear ring driver 140, which has a plurality of through-holes 14021 (indicated by dashed lines). The gear ring driver 140 is fastened to the rotor mast 14 by means of screws, which pass through the through-holes 14021, and selected blind holes 1411 (indicated by dashed lines) in the rotor mast/gear ring flange 141.

As tests have shown, the torque transfer from the gear ring 12, or more particularly, the gear ring driver 140, to the rotor mast 14 can be improved and secured. For this purpose, an additional form-fit connection between the rotor mast/gear ring flange 141 and the inner flange 1402 of the gear ring driver 140 is introduced. To this end, the surfaces of the rotor mast/gear ring flange 141 and of the inner flange 1402 that are to be brought into contact are each provided with additional corresponding toothing or cross-toothing 1412; 14022. The cross-shaped configuration is indicated by crosses in the figures. The toothed portions in each case project from the flange surfaces and engage with each other in a form-fit when the rotor mast/gear ring flange 141 and inner flange 1402 are screwed together. In addition to providing torque transfer over a large surface area through the contact of the rotor mast/gear ring flange 141 with the inner flange 1402 of the gear ring driver 140, the cross-toothing on both faces secures the seating of the contact surfaces of the flanges.

The helicopter transmission 1 shown here has four planetary gear carriers 11 that can rotate about fixed axes, whose planetary gears 111 enable the gear ring 12 to rotate. Here all the radial bearings 113, 130, 172, 151 are designed in the form of tapered roller bearings.

In particular, the planetary gear carrier bearings 113 should be embodied in the form of tapered roller bearings, since this leads to the achievement of increased maintenance intervals, i.e., lubricant monitoring and replenishment intervals.

The rolling elements of the tapered roller bearings are preferably made from ceramic, in particular from silicon nitride or zirconium dioxide. As tests have shown, the lubrication system must be monitored and replenished less often when such tapered roller bearings are used. Also the wear of the tapered roller bearings was less severe in service.

Optionally, the bearing mast 13 can be attached on the drive train side outside the transmission housing 10 to the helicopter load-bearing structure (not shown). This is possible because the bearing mast 13 remains locationally and rotationally fixed.

Due to the completely hollow body design of the bearing mast 13 and the rotor mast 14, cabling and/or control rods can be completely routed through the helicopter transmission 1. This makes a more compact design possible.

In accordance with a further preferred embodiment of the inventive helicopter rotor transmission 1, in accordance with FIG. 6 the bearing mast 13 can be configured in two parts. A first bearing mast element 132 is arranged on the drive train side, and at least some sections of the bearing mast element 132 are accommodated by a second bearing mast element 133. The first bearing mast element 132 can be regarded as a transmission shaft, about which the drive gear 16 and the sun wheel 17 connected to the drive gear 16 are rotatably mounted. As can be seen in FIG. 6, here the sun wheel bearings 172 are arranged between the transmission housing 10 and the sun wheel 17, and the sun wheel 17 is thereby rotatably mounted about the bearing mast element 132 of the bearing mast 13.

The second bearing mast element 133 of the bearing mast 13 is designed to taper from the drive train side in the direction towards the rotor side, whereby during assembly the second bearing mast element 133 is inserted from the drive train side through the central cavity of the transmission housing 10 in the direction towards the rotor side. Here, the second bearing mast element 133 can essentially be attached in the transmission housing 10 by means of a form-fitting bearing element 134 in the form of a sleeve.

In accordance with the further preferred embodiment shown here in FIG. 6, the rotor mast 14 and the gear ring driver 140 are, for example, manufactured as a single integral component.

LIST OF REFERENCE SYMBOLS

1 Helicopter rotor transmission
10 Transmission housing
100 Transmission housing mounting
101 Housing cover
11 Planetary gear carrier
P Planetary gear axis
111 Planetary gear (external gear)
1111 External toothing
112 Planetary drive gear
113 Planetary gear carrier bearing
12 Gear ring/internally toothed ring gear
120 Internal toothing
121 Means of attachment
13 Bearing mast (locationally and rotationally fixed)
130 Bearing between bearing mast and rotor mast
131 Cavity
132 First bearing mast element
133 Second bearing mast element
134 Form-fitting bearing element
14 Rotor mast
140 Gear ring driver
1401 Outer flange
14011 Through-holes
1402 Inner flange
14021 Through-holes
14022 Toothing
141 Rotor mast/gear ring flange
1411 Blind hole
1412 Toothing
142 Rotor coupling flange
15 Drive train
150 Drive train gear
151 Drive train mounting (ball bearing mounted)
16 Drive gear (rotates, fixed in position, moves gear ring, bevel gear)
17 Sun wheel (connected to drive gear)
170 Tubular section
171 External toothing
172 Sun wheel bearing
Z Central axis

The invention claimed is:

1. A helicopter rotor transmission with a transmission housing in which at least one central drive gear is mounted such that the at least one central drive gear can be rotated by at least one drive train,
wherein by means of the at least one central drive gear, indirectly a plurality of planetary gears arranged on planetary gear carriers defining respective planetary gear axes are mounted such that planetary gears can rotate, whereby a rotatable rotor mast can be rotatably driven about a central axis by means of the helicopter rotor transmission,
wherein, the helicopter rotor transmission has a central cavity, in which runs a locationally and rotationally fixed bearing mast, which is held passing through the transmission housing at least partially in the direction of the central axis,
wherein the at least one central drive gear is mounted on the bearing mast such that the at least one central drive gear can rotate, and by means of a sun wheel connected with the at least one central drive gear, a rotation of planetary drive gears about the planetary gear axes can be achieved on a side of the planetary gear carriers facing the at least one central drive gear, and
wherein by way of an operative connection between an internally toothed gear ring that can rotate about the central axis and planetary gears, surrounded by the gear ring, and mounted in a fixed manner such that the planetary gears can rotate about the planetary gear axes, the gear ring can be rotated such that the rotor mast can be set in rotation by means of a gear ring driver attached to the gear ring and the rotor mast.

2. The helicopter rotor transmission in accordance with claim 1, wherein the locationally and rotationally fixed bearing mast passes through the transmission housing, completely crossing the latter in the direction of the central axis, and the bearing mast and rotor mast are arranged concentrically relative to one another.

3. The helicopter rotor transmission in accordance with claim 1, wherein the bearing mast and the rotor mast are in each case configured as a hollow body with a central opening, such that components, such as control rods and/or cabling can be arranged passing completely between the bearing mast and the rotor mast in the direction of the central axis.

4. The helicopter rotor transmission in accordance with claim 1, wherein the bearing mast, configured so as to taper from the rotor side in the direction towards the drive train side, is inserted into the central cavity of the transmission housing and attached.

5. The helicopter rotor transmission in accordance with claim 1, wherein the at least one central drive gear comprises a plurality of central drive gears and wherein by means of the planetary gear carriers the plurality of central drive gears are arranged such that the plurality of central drive gears can rotate parallel to the planetary gears, spaced apart about the planetary gear axis.

6. The helicopter rotor transmission in accordance with claim 1, wherein the gear ring driver can be attached by means of an outer flange on the gear ring and an inner flange on a rotor mast/gear ring flange of the rotor mast.

7. The helicopter rotor transmission in accordance with claim 6, wherein surfaces of the rotor mast/gear ring flange and the inner flange that are to be brought into contact, are each provided with corresponding toothing or cross-toothing, whereby a form-fit connection is achieved.

8. The helicopter rotor transmission in accordance with claim 1, wherein the transmission housing can be closed by means of a housing cover surrounding the gear ring driver, wherein the housing cover is attached to the transmission housing and is not attached on the rotor mast side.

9. The helicopter rotor transmission in accordance with claim 1, wherein the helicopter rotor transmission further comprises planetary gear carrier bearings embodied in the form of tapered roller bearings.

10. The helicopter rotor transmission in accordance with claim 9, wherein the helicopter rotor transmission further comprises other radial bearings, bearings between the bearing mast and the rotor mast, sun wheel bearings, and drive train bearings, and wherein the other radial bearings, the bearings between the bearing mast and the rotor mast, the sun wheel bearings, and the drive train bearings are each embodied in the form of tapered roller bearings.

11. The helicopter rotor transmission in accordance with claim 10, wherein rolling elements of the tapered roller bearings of the other radial bearings, the bearings between the bearing mast and the rotor mast, the sun wheel bearings, and the drive train bearings are made from ceramic.

12. The helicopter rotor transmission in accordance with claim 11, wherein the ceramic is silicon nitride, silicon carbide, or zirconium dioxide.

13. The helicopter rotor transmission in accordance with claim 9, wherein rolling elements of the tapered roller bearings of the planetary gear carrier bearings are made from ceramic.

14. The helicopter rotor transmission in accordance with claim 13, wherein the ceramic is silicon nitride, silicon carbide, or zirconium dioxide.

* * * * *